No. 744,913. PATENTED NOV. 24, 1903.
T. J. GLYNN.
CAR FENDER.
APPLICATION FILED MAY 2, 1903.
NO MODEL.

Witnesses:
L. Boulton.
R. R. Lowry

Inventor:
Thomas J Glynn
By
C. C. D. Lewis
Attorney.

No. 744,913. Patented November 24, 1903.

UNITED STATES PATENT OFFICE.

THOMAS J. GLYNN, OF COAL CENTER, PENNSYLVANIA.

CAR-FENDER.

SPECIFICATION forming part of Letters Patent No. 744,913, dated November 24, 1903.

Application filed May 2, 1903. Serial No. 155,315. (No model.)

*To all whom it may concern:*

Be it known that I, THOMAS J. GLYNN, a citizen of the United States, residing at Coal Center, in the county of Washington and State of Pennsylvania, have invented a new and useful Improvement in Car-Fenders, of which improvement the following is a specification.

This invention relates to certain new and useful improvements in car-fenders, and has for its object the production of a fender which will readily and efficiently clear the track of obstacles and save life by preventing persons getting under the car and being maimed or killed by the same.

A further object of this invention is to provide a fender which might be applied to any moving vehicle, such as automobiles, cars, &c.

In describing the invention in detail reference will be had to the accompanying drawings, forming a part of this specification, in which like reference-numerals indicate like parts throughout both views, in which—

Figure 1:
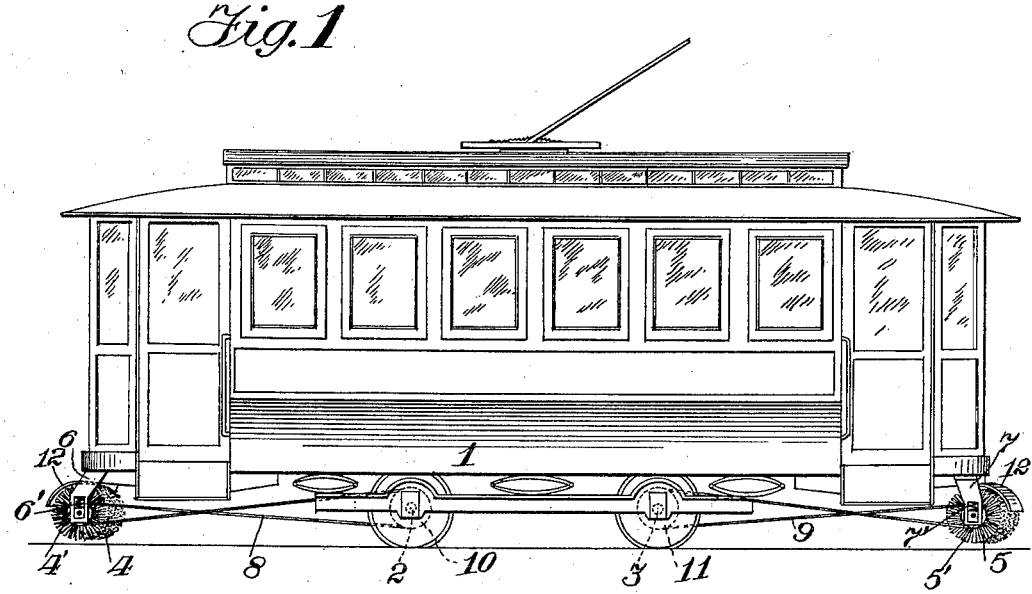
Figure 2:
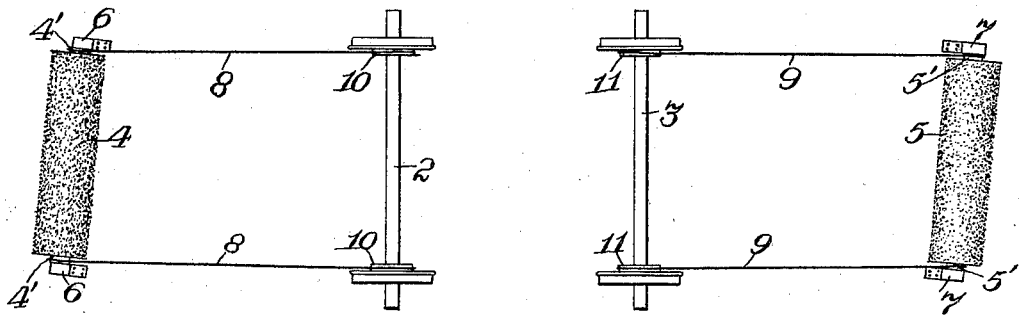

Figure 1 is a side elevation of a street-car with my improved fender applied thereto. Fig. 2 is a plan view showing the rotary brush forming my fender with the supporting-brackets and its belt connection with the car-axles of the car.

The reference-numeral 1 indicates a car body or frame, and 2 3 the axles thereof. Brushes 4 5, mounted in brackets 6 6 and 7 7, respectively, are provided on their ends with pulleys 4' 4' and 5' 5', over which endless belts 8 8 and 9 9 pass, the other end passing over suitable pulleys 10 10 and 11 11, secured to the car-axles 2 3, respectively. These brushes are located on each end of the car under the platform and preferably extend slightly in front of the same. These brushes are also mounted on a slight angle laterally in order that anything they come in contact with will be faced to the outside of the tracks. A metallic hood 12 is placed over the upper portion of the brush and secured to the car-frame to prevent the brush throwing objects against the front of the car.

The endless belts 8 8 and 9 9 are crossed, so that a movement opposite to that of the wheels of the car is imparted to the brush, thereby throwing any object the brush may come in contact with forward.

The brackets 6 6 and 7 7 are so constructed that the brush is slidably mounted therein; but springs 6' and 7' normally hold the brush in its downward position; but should the car rock the springs will yield, thus permitting the brush to rise.

The brush may be constructed of ratan, metal, or any other suitable material, and the endless belt for driving the same may be a small wire cable or chain, if desired.

While I have described the invention in detail as applied to a car, it is obvious that the same may by applied to any style car or, in fact, any moving vehicle, and that various slight changes of construction may be made without departing from the general spirit thereof.

Having fully described my invention, what I claim as new, and desire to secure by Letters Patent, is—

In a fender, a rotary brush disposed at an angle to the transverse axis of the car, brackets for supporting the brush, springs for yieldingly holding the brush in the brackets, pulleys carried by the brush, pulleys mounted on the car-axle, belts adapted to convey motion from the axle to the brush, and a hood supported over the brush, substantially as described.

In testimony whereof I have hereunto signed my name in the presence of two subscribing witnesses.

THOMAS J. GLYNN.

In presence of—
  F. O. HENZI,
  R. R. LOWRY.